US00RE41845E

(19) United States
(12) Reissued Patent
Jenkins

(10) Patent Number: US RE41,845 E
(45) Date of Reissued Patent: *Oct. 19, 2010

(54) PERSONAL EMERGENCY COMMUNICATION SYSTEM

(76) Inventor: Nevin Jenkins, 4203 S. Purslane Dr., Homosassa, FL (US) 34448

( * ) Notice: This patent is subject to a terminal disclaimer.

(21) Appl. No.: 12/038,477

(22) Filed: Feb. 27, 2008

Related U.S. Patent Documents

Reissue of:
(64) Patent No.: 7,231,200
Issued: Jun. 12, 2007
Appl. No.: 10/955,327
Filed: Sep. 30, 2004

(51) Int. Cl.
*H04W 04/00* (2006.01)

(52) U.S. Cl. ..... 455/404.1; 455/404.2; 340/539.12; 379/38; 379/40

(58) Field of Classification Search ..... 455/404.1–404
See application file for complete search history.

(56) References Cited

U.S. PATENT DOCUMENTS

| | | | | |
|---|---|---|---|---|
| 5,467,074 | A * | 11/1995 | Pedtke | 340/539.11 |
| 5,521,582 | A | 5/1996 | Kingston | |
| 6,262,655 | B1 | 7/2001 | Yoshioka et al. | |
| 7,231,200 | B2 | 6/2007 | Jenkins | |
| 7,315,736 | B2 | 1/2008 | Jenkins | |
| 2001/0000505 | A1 * | 4/2001 | Segal et al. | 455/405 |
| 2003/0027547 | A1 | 2/2003 | Wade | |
| 2004/0266390 | A1 * | 12/2004 | Faucher et al. | 455/404.1 |
| 2005/0176434 | A1 * | 8/2005 | White, Jr. | 455/445 |
| 2006/0073806 | A1 | 4/2006 | Jenkins | |
| 2006/0276166 | A1 | 12/2006 | Jenkins | |

OTHER PUBLICATIONS

*LogicMark, LLC* v. *Medical Alarm Concepts Holding, Inc. et al.,* Complaint filed in the Eastern District of Virginia on Nov. 24, 2009; pp. 1–31, and Exhibits 4 and 14–22.

*LogicMark, LLC* v. *Medical Alarm Concepts Holding, Inc. et al.,* Nevin Jenkins' Answer filed in the Eastern District of Virginia on Jan. 27, 2010; pp. 1–40.

*LogicMark, LLC* v. *Medical Alarm Concepts Holding, Inc. et al.,* LogicMark, LLC's Answer to Medical Alarm Concepts Holding, Inc. et al's Counterclaims filed in the Eastern District of Virginia on Feb. 11, 2010; pp. 1–7.

* cited by examiner

*Primary Examiner*—Charles N Appiah
*Assistant Examiner*—Jaime M Holliday
(74) *Attorney, Agent, or Firm*—Martin Fleit; Paul D. Bianco; Fleit Gibbons Gutman Bongini & Bianco PL

(57) ABSTRACT

A personal emergency communication system includes a user-carried portable communication unit having a single button, which when depressed by the user, wirelessly sends a call request signal to a base unit. The base unit initiates a telephone call through a dial-up network to an emergency [response center] *responder* and places [an operator at the emergency center] *the emergency responder* in wireless voice communication with the portable unit when the call is connected. A speech synthesizer operating in combination with automated voice messages stored in [the base unit] *system memory* are used to advise the user of the status of the call, and to provide the user with verbal confirmation that [functional systems of the base unit are] *the system is functionally* operating properly.

42 Claims, 4 Drawing Sheets

PERSONAL EMERGENCY COMMUNICATION SYSTEM

Matter enclosed in heavy brackets [ ] appears in the original patent but forms no part of this reissue specification; matter printed in italics indicates the additions made by reissue.

FIELD OF THE INVENTION

The present invention broadly relates to personal communication systems, and deals more particularly with a system for placing a user requiring emergency attention in direct voice communication with an emergency response center, such as a 911 operator.

BACKGROUND OF THE INVENTION

Various types of personal emergency communication devices had been developed which allow a person in need of immediate medical attention or other emergency service to contact an emergency service provider. In some cases, the user is required to subscribe to a proprietary communication system in which the service provider collects a monthly fee. These private systems typically rely on radio frequency communication between a portable communication unit worn or attached to the user, and a base station monitored by the service provider.

Numerous other forms of communication links have been employed to connect a remote subscriber with a monitoring station for emergency communications. Such links include telephone lines, cable television transmission lines, or dedicated land lines. Many recently developed systems utilize public telephone lines because they are widely available and require minimal installation expense.

User-carried portable communication units are available in a variety of forms, including those that are automatically activated by an emergency event and those that are manually activated by a user in the event of an emergency. In the case of portable units capable of establishing a communication link with an emergency response center, such as a 911 center, most prior systems, while capable of dialing a 911 number, are restricted in their ability to place the user in direct, two way voice communication with the 911 operator. Moreover, existing personal communication systems capable of remotely dialing a 911 operator require the user to use keypads or manipulate a number of buttons or switches on a portable communications unit in order to place the call. A problem exists with these prior systems, in that the user may be substantially incapacitated by the medical condition which gives rise to the emergency call, thereby diminishing the user's ability to complete the steps that are necessary to place the call. This problem is particularly prevalent with elderly users having limited manual dexterity or diminished vision.

Accordingly, there is a need in the art for a personal communication system which overcomes each of the disadvantages of the prior art discussed above, and which is both simple to use and inexpensive to construct. The present invention is directed toward satisfying this need.

SUMMARY OF THE INVENTION

According to one aspect of the invention, a personal emergency response communication system is provided, comprising a portable communications unit intended to be carried by a user who may require emergency attention, and a base communication unit coupled with a dial up telephone system for establishing direct, two way voice communication between the user and an emergency response center, such as a 911 center operator. The portable unit includes a wireless transmitter and a receiver for communicating with the base unit, and a single call button actuated by the user to initiate a call request signal that results in placing the user in voice communication with the emergency response center. The call button is recessed within a central opening in the portable unit and is surrounded with an upstanding ridge to aid the user in tactile location of the call button.

The base unit includes a wireless transmitter and receiver for communicating with the portable unit, a memory for storing a telephone number of the emergency response center, a dialer for dialing the emergency response center telephone number, and a controller responsive to the call request signal for controlling the dialer to dial the emergency response center telephone number. The portable unit includes an acoustic transducer providing the portable unit with a speaker phone function, thereby allowing voice communication between the user and the emergency response center. The base unit includes one or more preselected voice messages stored in a memory, and a speech synthesizer which provides the user with automatic voice messages reporting the status of the call as well as the operational status of the base unit. The portable unit includes a test feature that may be initiated by the user to carry out functional testing of operating systems in the base unit.

According to another aspect of the invention, a personal emergency response communication system is provided, comprising a portable, wireless communication unit intended to be carried by a user who may require emergency attention, and a base communication unit for wirelessly communicating with the portable unit. The portable unit includes a single, centrally located call button activatable by the user to transmit a call request signal to the base unit.

The base unit is coupled with a public dial up telephone system and is responsive to the call request signal for establishing voice communications between the user and an emergency response center. The base unit includes at least one stored voice message indicating the status of the communications with the response center, and a controller for controlling the transmission of the voice message to the portable unit in order to advise the user of the communications status. The base unit also includes a speech synthesizer for generating the stored voice message. In a preferred embodiment, the base unit includes two stored voice messages respectively indicating that the base unit has commenced dialing a call to the response center, and that the base unit is subsequently terminating the call when voice communications have been completed. The base unit may include a third stored voice message to advise the user of the operational status of various functional systems contained in the base unit.

According to still another aspect of the invention, a method is provided for calling an emergency response center from a user carried, portable communications unit, comprising the steps of: transmitting a call request signal from the portable unit to a base unit; receiving the call request signal at the base unit; using the base unit to place a call to a telephone number of the emergency response center in response to the call request signal; storing at least a first voice message at the base unit indicating the status of the call that has been placed; and, transmitting the first voice message from the base unit to the portable unit in order to advise the user of the call status.

Accordingly, it is a primary object of the present invention to provide a personal emergency communication system which is simple in construction and operation, and allows a user to establish direct, two way voice communications with an emergency response center, such as a 911 center.

Another object of the invention is to provide a communication system as described above which employs a user-carried, portable communication unit having a single, easy-to-locate call button used to initiate a 911 call.

A still further object of the invention is to provide a communication system of the type mentioned above which provides the user with preselected voice messages that inform the user of the status of the call that has been placed to the 911 center.

Another object of the invention is to provide a communication system as mentioned immediately above in which the user may employ the portable unit to cause functional tests be carried out in a base unit to confirm that the base unit is operating properly.

A further object of the invention is to provide a communication system as described immediately above which provides the user with voice confirmation that functional tests of the base unit have been carried out with satisfactory results.

These non-limiting features, as well as other advantages and objects of the invention may be better understood by considering the following details of a description of a preferred embodiment of the present invention.

BRIEF DESCRIPTION OF THE DRAWINGS

In the drawings, which form an integral part of the specification, and are to be read in conjunction therewith, and which like reference numerals are employed to designate identical components in the various views.

DETAILED DESCRIPTION OF THE PREFERRED EMBODIMENT

Figure 1:
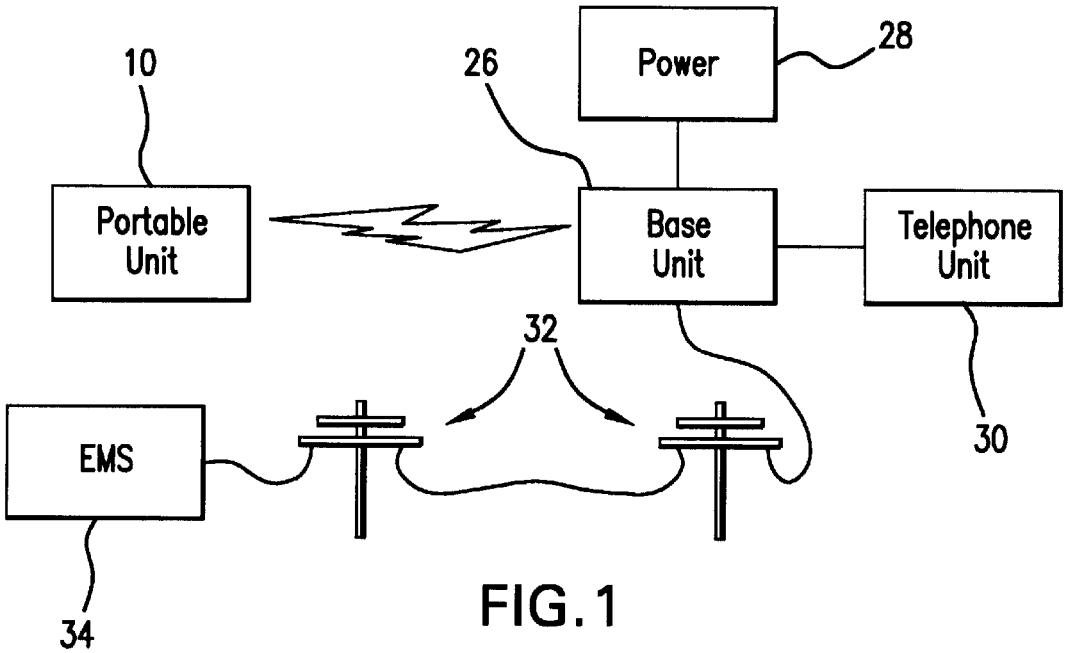
FIG. 1 is a functional block diagram of a personal emergency communication system, which forms the preferred embodiment of the present invention.

Referring first to FIG. 1, the present invention relates to a personal emergency communication system broadly comprising a base unit 26 which communicates via radio frequency (RF) signals with a portable unit 10 that is either worn or attached to a user who may require emergency attention. The base unit 26 derives power from a suitable electrical power source 28, and is coupled with a public dial-up telephone network 32. A conventional telephone unit 30 may be optionally coupled to the base unit 26 in order to provide normal access to the telephone network 32. As will be described later in more detail, the base unit 26 functions to place the portable unit 10 in two way voice communication via the telephone network 32 with an emergency response center, herein illustrated as an emergency medical service (EMS) center 34.

Figure 2:
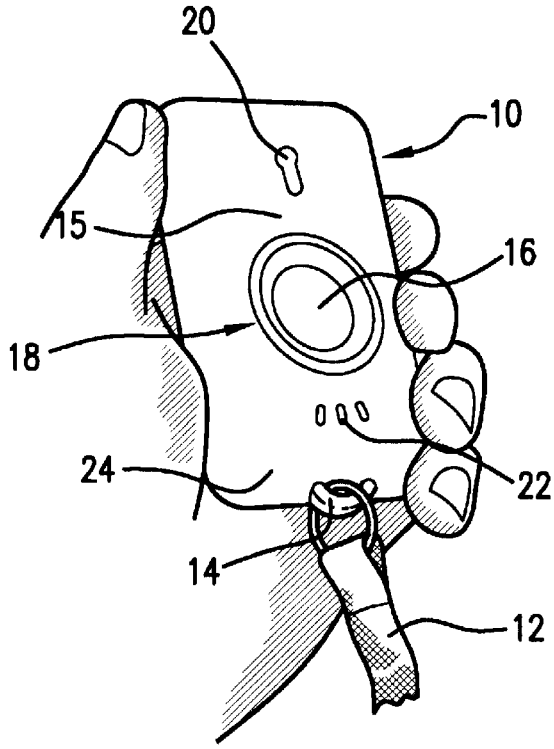
FIG. 2 is a perspective view of a portable unit forming a portion of the system showed in FIG. 1, shown being held in a user's hand.
Figure 3:
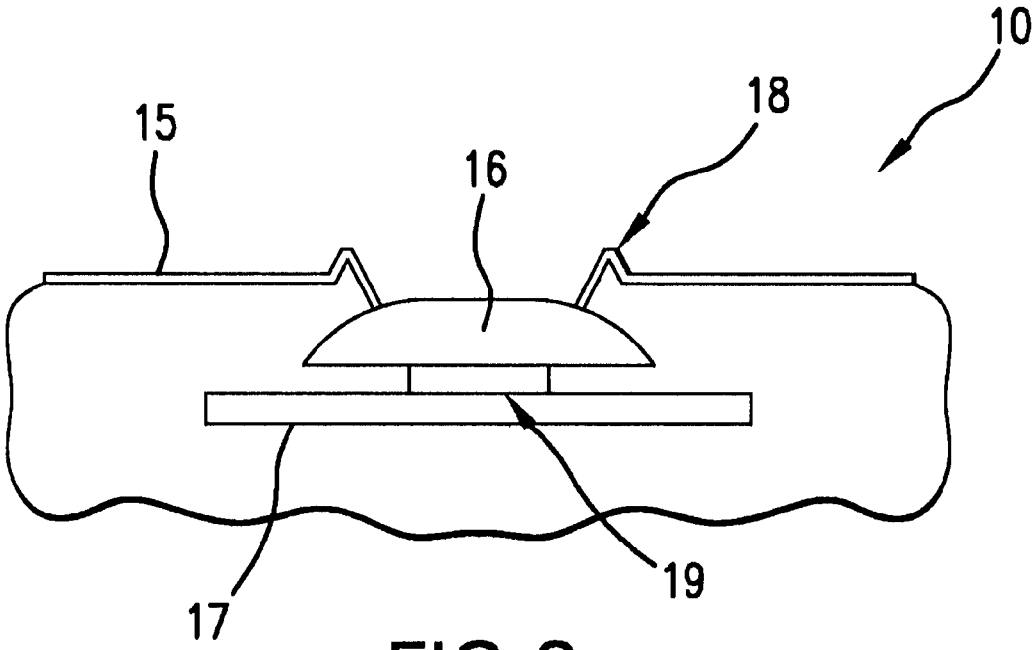
FIG. 3 is a fragmentary, cross-sectional view taken through the outer face of the unit shown in FIG. 2, to better reveal the recessed position of the call button.

Reference is now made to FIGS. 2 and 3 which depict the physical details of the portable unit 10. Unit 10 comprises a generally rectangular case or housing 15 having dimensions small enough to permit the unit to be held in a user's hand, as shown in FIG. 2. The case 15 may be formed of any suitable material such as plastic, aluminum or titanium and, significantly, includes appropriate gaskets, O-rings or other suitable seals to assure that the unit 10 remains water tight when subjected to brief immersion in water. By this feature, the user may wear the unit 10 while bathing without fear of damage to the unit. The case 15 is provided with a mounting loop 14 formed on one end thereof. A lanyard 12 is removably attached to the case 15 by means of a clip attached to the loop 14. The portable unit 10 may be worn as a pendant with the lanyard 12 looped around the user's neck. Alternatively, the case 15 may be provided with a clip (not shown) for removably attaching the unit 10 to the user's belt or other article of clothing.

The unit 10 further includes an acoustic transducer or speaker 22 which acts both as a microphone and a speaker to provide the unit 10 with a speaker phone function. The speaker 22 is a readily available commercial device, similar to speaker phone devices used in common cell phones and preferably has dimensions and performance such that the user can clearly hear a voice produced by the speaker 22 at a distance of at least 15 inches.

An LED 20 is provided in the face of the case 15 to provide the user with a visual indication of certain later discussed operating functions, such indicating that the unit 10 has been activated to initiate a call. A test button 24 is provided near the bottom of the case 15 to allow the user to test the unit's battery strength and to interrogate the base unit 26 to determine whether certain base unit operating systems are functioning properly.

A circular call button 16 is recessed into a central opening in one face of the case 15 and is surrounded by an upstanding, ring shaped ridge 18. Recessing the call button 16 within the case 15 reduces the possibility of inadvertent button actuation while also providing a tactile surface feature in the case 15 that allows the user to more quickly locate the call button 16. The upstanding ridge 18 also assists in avoiding unintended button actuation. As shown in FIG. 3, button 16 includes a projection 19 on its lower face which is displaced downwardly by movement by the button 16 to actuate a switch or similar device mounted on a printed circuit board 17.

The portable unit 10 is powered by an electrical battery, preferably comprising one or more replaceable lithium battery cells. A common lithium battery will normally provide unit 10 with at least 1 year of operability on a standby basis, and will be sufficient to provide a minimum of 30 minutes of uninterrupted conversation.

As will be discussed later, the portable unit 10 includes a radio frequency transmitter and a receiver provided with an antenna that is contained completely inside the case 15.

Figure 4:
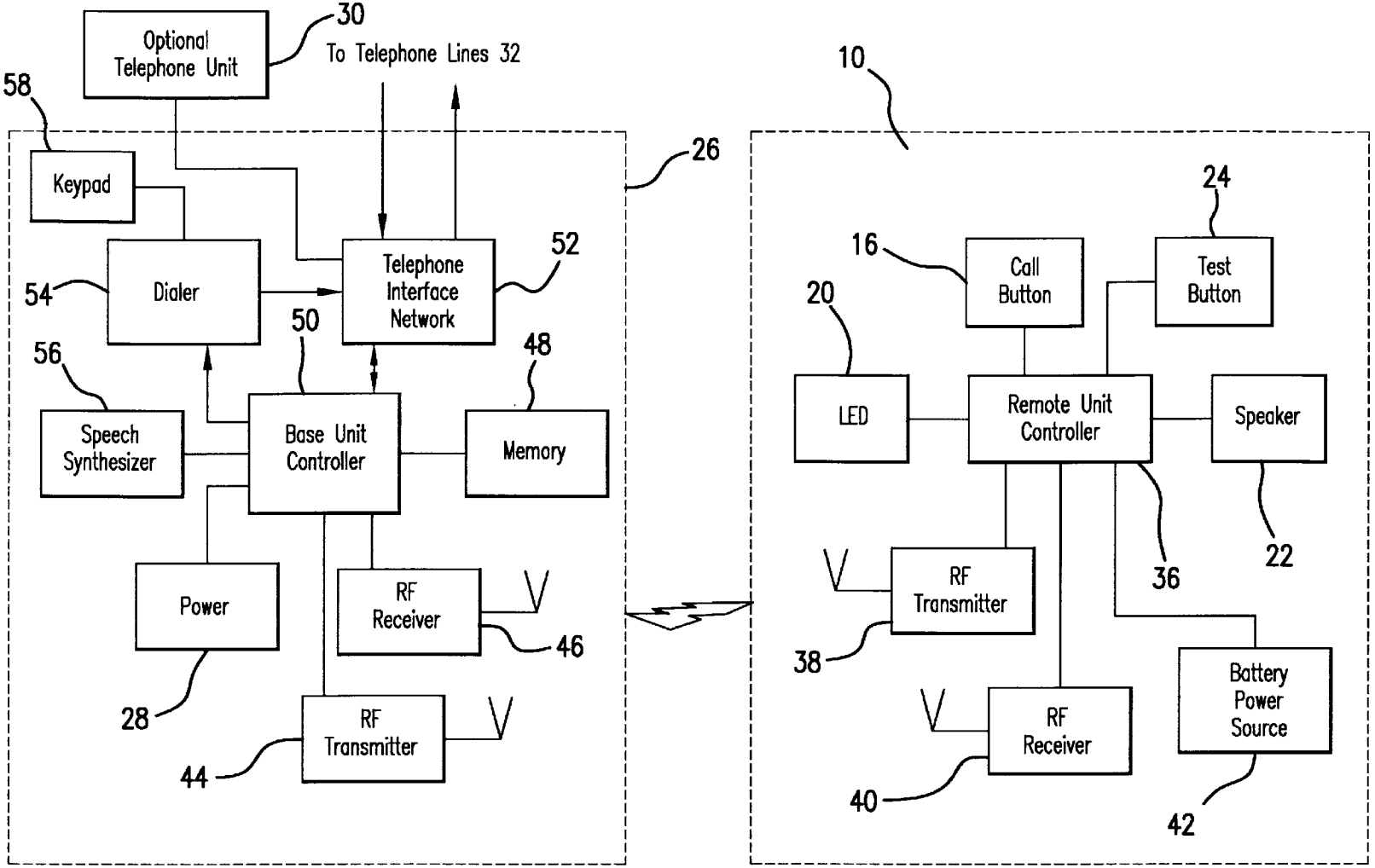
FIG. 4 is a functional block diagram showing the details of the portable unit and the base unit depicted in FIG. 1; and, FIG. 5 is a flow chart showing the steps in placing a call to a 911 center using the communication system of the present invention.

Reference also now made to FIG. 4 which depicts further details of the portable unit 10 and the base unit 26. Broadly, the portable unit 10 includes a remote unit controller 36 which may comprise a suitable micro-processor IC for controlling various operations of the unit 10. The call button 16 and the test button 24 form inputs to the controller 36, while speaker 22 and LED 20 receive output signals from the controller 36. The controller 36 also controls the operation of a radio frequency transmitter 38 and a radio frequency receiver 40 which, if desired, may be combined into a single radio transponder. The transponder may be any of various, commercially available radios operating, for example, in the 800 MHz spectrum.

Actuation of the call button 16 by the user results in the controller 36 turning on the LED 20 and generating a call request signal that is wirelessly transmitted to the base unit 26 by the RF transmitter 38. The LED 20 provides the user with visual confirmation that a call request signal has been transmitted to the base unit 26. The RF receiver 40 receives incoming RF signals from the base unit 26 which are processed by the controller 36. Incoming signals containing voice communications are delivered to the speaker 22. The controller 36 preferably includes a time delay circuit which prevents the call request signal from being generated unless the call button 16 is depressed for at least a preselected amount of time, for example one half second. This feature prevents a call from being initiated to a 911 center as a result of inadvertent, momentary activation of the call button 16.

When the user depresses and briefly holds down the test button 24, the controller 36 performs a test to determine the strength of the battery power source 42. If the remaining battery strength is above a threshold voltage, the controller turns on LED 20 to provide the user with a visual indication that the battery strength is adequate.

When the user depresses and holds down the test button 24 for a longer, preselected time period, for example five seconds or more, the controller 36 causes a test request signal to be wirelessly transmitted to the base unit 26. Simultaneously, the controller 36 causes the LED 20 to flash during this test sequence. The test request signal received at the base unit 26 is processed by a base unit controller 50 which causes a series of functional tests to be performed on certain operating systems of the base unit 26. Upon successful completion of the base unit 26 functional tests, a preselected voice message is transmitted from the base unit 26 to the portable unit 10 and is announced by the speaker 22 to alert the user that the test was successful and that all systems in the base unit 26 are operating properly. This voice message may comprise, for example, "System check. All functions are OK"

The base unit 26 includes an RF transmitter and receiver, 44, 46, which communicate with the remote unit 10. The base unit controller 50 may comprise a commercially available microprocessor which controls various functions of the base unit 26, including the transmission and reception of RF signals between the base unit 26 and the remote unit 10. The base unit 26 includes a suitable power source which may comprise an AC adapter that can be plugged into an ordinary electrical wall outlet. A memory 48 is provided to store various information, such as the telephone number of one or more emergency response centers, including the common 911 number. One or more voice messages also may be stored in the memory 48 which are recalled by the controller 50 and are delivered to a speech synthesizer 56 which may comprise a commercially available "speech chip" having approximately 10 seconds or more of play time. The base unit 26 includes a telephone interface network 52 which interfaces the base unit 26 with a public telephone network shown as telephone lines 32. Controller 50 operates a conventional dialer 54 which produces DTMF (Dual Tone Multiple Frequency) signals that are delivered through the interface network 52 in order to place a call through the telephone lines 32. An optional key pad 58 may be employed to manually input call numbers to the dialer 54 or into the memory 48.

As previously mentioned, a conventional telephone unit 30 may be optionally connected to the telephone interface network 52 by way of an input port provided in the base unit 26.

Figure 5:
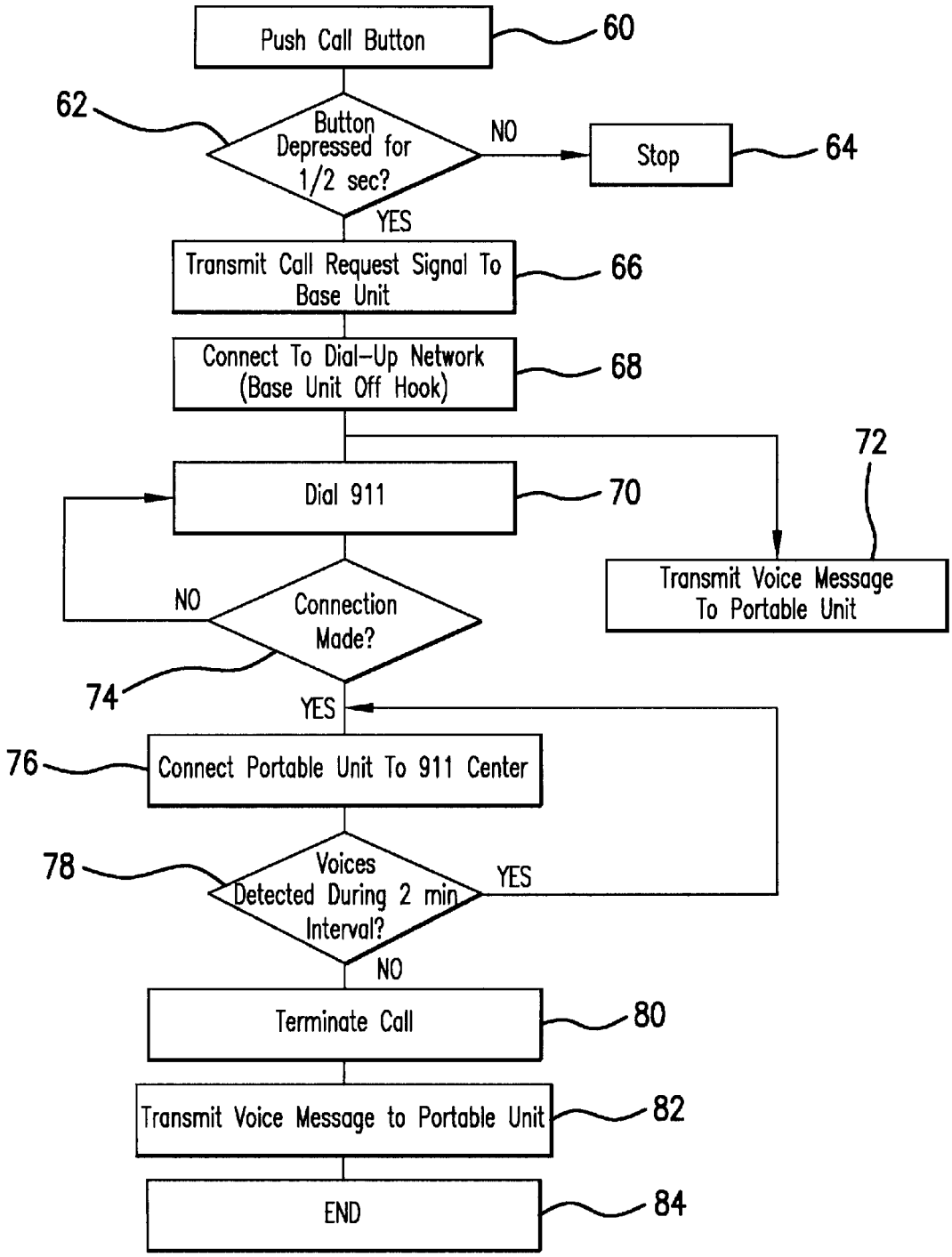

Referring also to FIG. 5, the operation of the present communication system will now be described. Prior to an emergency that warrants activation of the system, the portable unit 10 is in an inactive, standby mode, and the base unit 26 is "on hook" which means that the base unit 26 is also standing by and has not yet made an active connection with the telephone line 32. In the event of an emergency in which the user requires personal assistance, the user presses the call button 16 at step 60. If the call button 16 is depressed for at least a certain length of time at 62, a call request signal is generated by the portable unit 10 and transmitted to the base unit 26. If, however, the call button is depressed for a shorter length of time, then the call process is stopped at 64.

As shown at step 68, upon receipt of the call request signal at the base unit 26, the controller 50 retrieves the telephone number of an emergency response center from memory 48 and instructs the dialer 54 to dial the number, as is shown at step 70. Simultaneously, controller 50 retrieves a voice message from memory 58 which is processed by the speech synthesizer 56 and wirelessly transmitted to the portable unit 10. This voice message, which for example, may comprise "Your emergency call is now being dialed. Please standby" is announced through the speaker 22, thereby giving the user audible voice confirmation that the call is being placed.

As shown at step 74, if a connection is not made, the dialing sequence is repeated, otherwise a connection is made, and the base unit controller 50 connects the emergency center operator with the portable unit 10, as shown at step 76, thereby placing the user in direct, two way voice communication with the emergency center operator. At this point, the user may give the emergency center operator information concerning the nature of the user's emergency, his location and other important information. The connection between the user and the emergency operator continues until such time as the base unit controller 50 does not detect any voice communication between the parties for a preselected length of time, for example a period of two minutes.

At step 78, if no voice communications are detected during this preselected time period, the controller 50 directs the telephone interface network 52 to terminate the call at step 80. Then, as shown at step 82, the controller 50 retrieves a pre-selected voice message from memory 48 and causes a speech synthesizer 56 to produce a voice message that is transmitted to the portable unit and played through the speaker 22 to alert the user that the call is being terminated. This message may comprise, for example, "help is on the way." Upon termination of the call, the base unit 26 returns to its standby "on hook" status, the portable unit 10 likewise returns to its standby mode until another call is initiated by the user, and the sequence of events ends at 84.

It is to be understood that the specific systems, methods and techniques which have been described above are merely illustrative of one application of the principles of the invention. Numerous modifications may be made to the system as described without departing from the true spirit and scope of the invention.

What is claimed:

1. A personal emergency response communications system comprising:

a portable communications unit intended to be carried by a user who may require emergency attention, including:

(1) a wireless transmitter and a wireless receiver for respectively transmitting and receiving communication signals, (2) a call button actuatable by the user to initiate a call request signal that will result in placing the user in voice communication with an emergency response center; and a base communications unit coupled with a dial-up telephone system for establishing voice communication between the user and the emergency response center, the base unit including (3) a wireless transmitter and a wireless receiver for respectively transmitting and receiving communication signals, (4) a memory for storing a telephone number of the emergency response center, (5) a dialer for dialing the emergency response center telephone number, (6) a controller responsive to the call request signal for controlling the dialer to dial the emergency response center telephone number, wherein the base unit includes a speech synthesizer for producing preselected voice messages indicative of the status of the call request, and the controller is operative to deliver the preselected voice messages to the portable unit; and wherein the preselected voice messages include a first voice message indicating that the emergency response center number is being dialed, and a second voice message indicating that the call to the center is being terminated.

2. The communications system of claim 1, wherein the portable unit includes an acoustic transducer for converting the user's speech into electrical signals, and for converting electrical signals received from the base unit into audible speech.

3. The communications system claim 1, wherein the portable unit includes a portable unit controller, and a test button actuatable by the user, the portable unit controller being responsive to the actuation of the test button to transmit a test request signal to the base unit, the base unit being responsive to the test request signal to perform a test of certain functions of the base unit and transmit a synthesized voice message to the portable unit announcing the results of the test.

4. The communications system of claim 1, wherein the portable unit includes a battery power source, and a battery test button actuatable by the user to initiate a test of the battery power source.

5. The communications system of claim 1, wherein the portable unit includes a lamp for indicating the operational status of the portable unit.

6. The communications system of claim 1, wherein the portable unit includes a portable unit controller operative to terminate communications between the base unit and the portable unit if the portable unit does not detect the voice of the user during a preselected time period.

7. The communications system of claim 1, wherein the portable unit includes a housing having an opening within which the call button is mounted, and a raised ring circumscribing the call button and extending outwardly from the surface of the housing to provide the user with a tactile guide for locating the call button.

8. The communications system of claim 7, wherein the call button is recessed within the housing opening.

9. The communications system of claim 1, wherein the portable unit includes means for removably attaching the portable unit to the user's body.

10. A personal emergency response communications system comprising:

a portable communications unit intended to be carried by a user who may require emergency attention, the portable unit including a call button actuatable by the user to transmit a call request signal; and a base communications unit for wirelessly communicating with the portable unit, the base unit being coupled with a dial-up telephone system and responsive to the call request signal for establishing voice communications between the user and the emergency response center, the base unit including at least one stored voice message indicating the status of the communications with the emergency response center and a controller for controlling the transmission of the voice message to the portable unit in order to advise the user of the communications status;

wherein the base unit includes two stored voice messages respectively indicating the status of the communications with the emergency response center when the base unit begins dialing a telephone number of the center, and when the base unit terminates communications with the emergency response center.

11. The communications system of claim 10, wherein the base unit includes a speech synthesizer for generating the stored voice message.

12. The communications system of claim 10, wherein the base unit includes a further stored voice message indicating the status of an operational test performed on the base unit.

13. The communications system claim 10, wherein the portable unit includes a portable unit controller, and a test button actuatable by the user, the portable unit controller being responsive to the actuation of the test button to transmit a test request signal to the base unit, the base unit being responsive to the test request signal to perform a test of certain functions of the base unit and transmit a synthesized voice message to the portable unit announcing the results of the test.

14. The communications system of claim 10, wherein the portable unit includes a battery power source, and a battery test button actuatable by the user to initiate a test of the battery power source.

15. The communications system of claim 10, wherein the portable unit includes a portable unit controller operative to terminate communications between the base unit and the portable unit if the portable unit does not detect the voice of the user during a preselected time period.

16. A method of calling an emergency response center from a user-carried, portable communication unit, comprising the steps of:

(A) transmitting a call request signal from the portable unit to a base unit;

(B) receiving the call request signal at the base unit;

(C) using the base unit to place a call to a telephone number of the emergency response center in response the call request signal;

(D) storing at least a first voice message at the base unit indicating the status of the call placed in step (C);

(E) transmitting the first voice message from the base unit to the portable unit to advise the user of the call status;

wherein the first voice message notifies the user that the call is being placed.

17. The method of claim 16, including the step of placing the portable unit in voice communication with the emergency response center when the center answers the call dialed in step (C).

18. The method of claim 16, wherein step (D) includes storing a second voice message at the base unit, the second message notifying the user that the call to the emergency response center is being terminated, and the method further includes transmitting the second voice message from the base unit to the portable unit.

19. The method of claim 16, including the steps of:

(F) performing a functional test of the operating systems of the base unit;

(G) storing a second voice message at the base unit advising the user that the test performed in step (F) was successful; and, (H) transmitting the second voice message from the base unit to the portable unit to alert the user that the functional test was successful.

*20. A personal emergency response communications system, comprising:*

*a portable communications unit intended to be carried by a user who may require emergency attention, including*

*(1) a wireless transmitter and a wireless receiver for respectively transmitting and receiving communication signals,*

*(2) a call button actuatable by the user to initiate a call request signal that will result in placing the user in voice communication with an emergency response provider, and*

*(3) a speaker for playing first and second voice messages to the user;*

*a base communications unit coupled with a communication system for establishing voice communication between the user and the emergency response provider, the base unit including*

*(1) a wireless transmitter and a wireless receiver for respectively transmitting and receiving communication signals, and*

*(2) a device for initiating a communication to an emergency response provider upon receiving a call request signal from the portable communications unit,*

*memory for storing electrical signals convertible into first and second voice messages, wherein the first voice message indicating that communication with the emergency response provider is being initiated, and the second voice message indicating that the communication with the emergency response provider is being terminated;*

*a controller responsive to a call request signal for controlling the communication to the emergency response provider; and*

*sound reproducing circuitry for reproducing the first and second voice messages.*

*21. The communications system of claim 20, wherein the portable unit includes an acoustic transducer for converting the user's speech into electrical signals and for converting electrical signals received from the base unit into audible speech.*

*22. The communications system of claim 20, wherein the portable unit includes a portable unit controller, and a test button actuatable by the user, the portable unit controller being responsive to the actuation of the test button to transmit a test request signal to the base unit, the base unit being responsive to the test request signal to perform a test of certain functions of the base unit and in response by the speaker plays a voice message announcing the results of the test.*

*23. The communications system of claim 20, wherein the portable unit includes a battery power source, and a battery test button actuatable by the user to initiate a test of the battery power source.*

*24. The communications system of claim 20, wherein the portable unit includes lighting for indicating the operational status of the portable unit.*

*25. The communications system of claim 20, wherein the portable unit includes a portable unit controller operative to terminate communications between the base unit and the portable unit if the portable unit does not detect the voice of the user during a preselected time period.*

*26. The communications system of claim 20, wherein the portable unit includes a housing having an opening within which the call button is mounted, and a raised ring circumscribing the call button and extending outwardly from the surface of the housing to provide the user with a tactile guide for locating the call button.*

*27. The communications system of claim 26, wherein the call button is recessed within the housing opening.*

*28. The communications system of claim 20, wherein the portable unit includes an attachment for removably attaching the portable unit to the user.*

*29. A personal emergency response communications system, comprising:*

*a portable, wireless communications unit intended to be carried by a user who may require emergency attention, the portable unit including a call button actuatable by the user to transmit a call request signal, and a speaker for playing first and second voice message to the user; and*

*a base communications unit for wirelessly communicating with the portable unit, the base unit being coupled with a communication system and responsive to a call request signal for establishing voice communications between the user and an emergency response provider, memory in said system including first and second voice messages, wherein the first and second voice messages, respectively, indicate the status of the communications with the emergency response provider when the base unit initiates communication with the emergency response provider, and when the base unit terminates communications with the emergency response provider; and*

*a controller for playing the first and second voice messages to a user through the speaker.*

*30. The communications system of claim 29, including a speech synthesizer for generating the first and second voice messages.*

*31. The communications system of claim 29, wherein the memory includes a third voice message indicating the status of an operational test performed on the base unit.*

*32. The communications system claim 29, wherein the portable unit includes a portable unit controller, and a test button actuatable by the user, the portable unit controller being responsive to the actuation of the test button to transmit a test request signal to the base unit, the base unit being responsive to a test request signal to perform a test of certain functions of the base unit and said memory including a third voice message for announcing to the user the results of the test.*

*33. The communications system of claim 29, wherein the portable unit includes a battery power source, and a battery test button actuatable by the user to initiate a test of the battery power source.*

*34. The communications system of claim 29, wherein the portable unit includes a portable unit controller operative to terminate communications between the base unit and the portable unit if the portable unit does not detect the voice of a user during a preselected time period.*

*35. A method of calling an emergency response provider from a user-carried, portable communication unit, comprising the steps of:*

*(A) receiving at a base unit a call request signal initiated from a user-carried, portable communication unit;*

*(B) initiating communication from the base unit via a stored reference to an emergency response provider in response to the base unit receiving a call request signal;*

(C) *playing to the user via a speaker at least a first voice message stored in a memory advising the user that the communication is being initiated; and*

(D) *playing to the user via the speaker a second voice message, the second message notifying the user that the communication with the emergency response provider is being terminated.*

*36. The method of claim 35, including the step of placing the portable unit in voice communication with an emergency response provider after having initiated the communication via the stored reference of the emergency response provider.*

*37. The method of claim 35, including the further steps of:*

(D) *performing a functional test of the operating systems of the base unit; and*

(E) *playing a voice message advising the user that the functional test performed in step (D) was successful.*

*38. The method of claim 35, including the further steps of:*

(F) *performing a functional test of a battery power source contained in the user-carried, portable communication unit responsive to a battery test button being actuated; and*

(G) *playing a voice message advising the user of the condition of the battery power source.*

*39. A personal emergency response communications system for calling a 911 emergency response center, comprising:*

A. *a portable communications unit intended to be carried by a user who may require 911 emergency attention, including*

(1) *a first wireless transmitter and a wireless receiver for respectively transmitting and receiving communication signals to a base communications unit,*

(2) *a call button actuatable by the user to initiate a call request signal to a base unit that will result in placing the user in direct voice communication with a 911 operator in a 911 emergency response center, and*

(3) *a speaker for playing a voice message to the user;*

B. *a base communications unit coupled with a communication system for establishing direct voice communication between the user and an operator of a 911 emergency response center, the base communication unit including*

(1) *a second wireless transmitter and a wireless receiver for respectively transmitting and receiving communication signals to place the user in direct two-way voice communication with a 911 operator, and*

(2) *a device for initiating a communication to a 911 emergency response center upon receiving a call request signal from the portable communications unit,*

C. *memory for storing electrical signals convertible into two voice messages, wherein one voice message indicates that communication with a 911 emergency response center is being initiated, and the second voice message indicates that the communication with the 911 emergency response center is being terminated;*

D. *a controller responsive to a call request signal for controlling the communication to a 911 emergency response center;*

E. *sound reproducing circuitry for reproducing the voice messages and for playing the reproduced voice messages through the speaker in the portable unit.*

*40. A method of calling a 911 emergency response center from a user-carried, portable communication unit, comprising the steps of:*

(A) *receiving at a base unit a call request signal initiated from a user-carried, portable communication unit;*

(B) *initiating direct two-way voice communication from the base unit via a stored reference to a 911 emergency response center in response to the base unit receiving a call request signal;*

(C) *playing to the user via a speaker at least a first voice message stored in a memory advising the user that the communication with is being initiated; and*

(D) *playing to the user via the speaker a second voice message, the second message notifying the user that the direct two-way voice communication with the 911 emergency response center is terminated.*

*41. The method of claim 40, including the further steps of:*

(D) *performing a functional test of the operating systems of the base unit; and*

(E) *playing a voice message advising the user that the functional test performed in step (D) was successful.*

*42. The method of claim 40, including the further steps of:*

(F) *performing a functional test of a battery power source contained in the user-carried, portable communication unit responsive to a battery test button being actuated; and*

(G) *playing a voice message advising the user of the condition of the battery power source.*

* * * * *

UNITED STATES PATENT AND TRADEMARK OFFICE

CERTIFICATE OF CORRECTION

PATENT NO. : RE41,845 E
APPLICATION NO. : 12/038477
DATED : October 19, 2010
INVENTOR(S) : Nevin Jenkins It is certified that error appears in the above-identified patent and that said Letters Patent is hereby corrected as shown below:

Claim 29, column 10, lines 14-35 should read:

29. A personal emergency response communications system, comprising:

a portable, wireless communications unit intended to be carried by a user who may require emergency attention, the portable unit including a call button actuatable by the user to transmit a call request signal, and a speaker for playing first and second voice message to the user; and a base communications unit for wirelessly communicating with the portable unit, the base unit being coupled with a communication system and responsive to a call request signal for establishing voice communications between the user and an emergency response provider, memory in said system including first and second voice messages, wherein the first and second voice messages, respectively, indicate the status of the communications with the emergency response provider when the base unit initiates communication with the emergency response provider, and when the base unit terminates communications with the emergency response provider; and a controller for playing the first and second voice messages to a user through the speaker.

Signed and Sealed this
Fourth Day of January, 2011

David J. Kappos

David J. Kappos
*Director of the United States Patent and Trademark Office*